Patented Feb. 20, 1923.

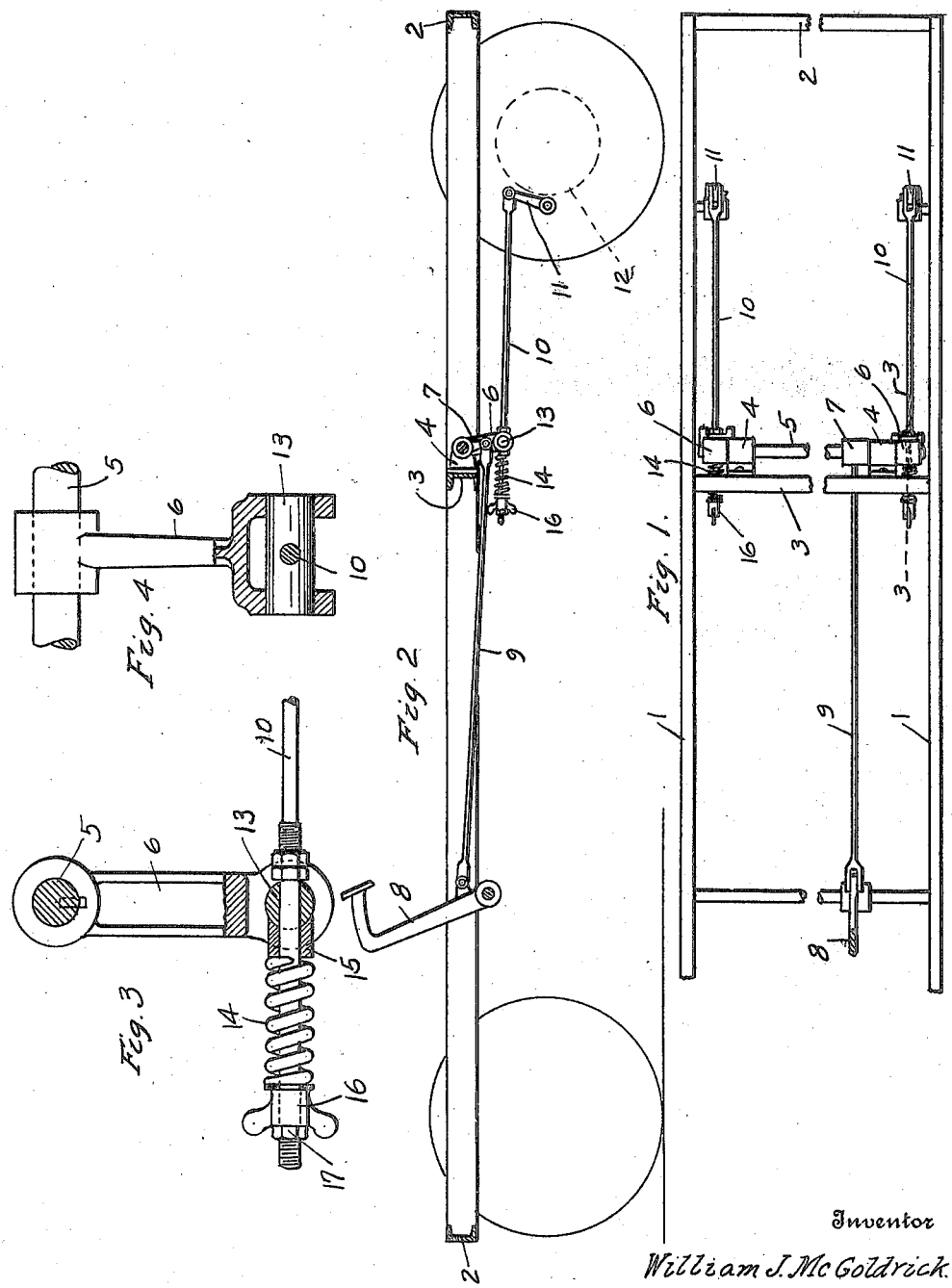

1,445,698

UNITED STATES PATENT OFFICE.

WILLIAM J. McGOLDRICK, OF DETROIT, MICHIGAN, ASSIGNOR TO POWER TRUCK AND TRACTOR COMPANY, OF DETROIT, MICHIGAN, A CORPORATION OF DELAWARE.

VEHICLE BRAKE MECHANISM.

Application filed January 31, 1921. Serial No. 441,171.

*To all whom it may concern:*

Be it known that I, WILLIAM J. McGOLDRICK, a citizen of the United States, residing at Detroit, in the county of Wayne and State of Michigan, have invented a new and useful Vehicle Brake Mechanism, of which the following is a specification.

This invention relates to vehicle brake mechanisms and more particularly to the brake mechanisms of motor vehicles.

The principal object of the invention is to provide in a foot-pedal brake actuating mechanism means to secure a yieldable and resilient power transmitting connection between the control member and the brake bands of the wheels so that the brakes may not be applied with undesirable abruptness, also to insure an even and uniform distribution of the braking stress upon both of the driving wheels so as to avoid subjecting the vehicle to undue racking strains and the tendency to swerve or "skid" commonly resulting from the unequal braking of the wheels.

A further object of the invention is to provide a brake actuating mechanism that will permit of a quick and accurate adjustment to equalize the braking pressure applied to the two drive wheels, when such adjustment becomes necessary to compensate for wear.

In attaining these objects the invention contemplates the employment of a rock shaft actuable from the brake control member through a suitable pull rod, and a pair of pull rods for respectively controlling the brake bands through rocking of said shaft and springs respectively mounted upon said pull rods, and stressed in applying control through said rods, provision being made for adjusting the stresses in said springs.

A preferred embodiment of the invention is hereinafter described and is illustrated in the accompanying drawing, wherein, Fig. 1 is a plan view of a motor vehicle frame carrying a brake control mechanism improved in accordance with the present invention.

Fig. 2 is a longitudinal vertical sectional view of the same.

Fig. 3 is a detail vertical section on line 3—3 of Fig. 1, showing the yieldable and adjustable element of the control mechanism.

Fig. 4 is a view of the same transverse to Fig. 3, and in partial section.

In these views the reference character 1 designates the side rails of a motor vehicle frame, 2 the end members of said frame, and 3 an intermediate cross piece of said frame. Upon said cross-piece there is mounted a pair of bearings 4 in which a rock-shaft 5 is journaled. Said rock-shaft terminally carries depending arms 6 and at an intermediate point carries a relatively short depending arm 7. The brake pedal 8 is connected by a pull rod 9. Pull rods 10 respectively extend rearwardly from the rock arms 6 to rock arms 11 adjacent the brake drums 12, and controlling through the usual means (not shown) the application of the braking pressure to said drums. A sliding engagement is established between the arms 6 and rods 10 by extending the latter slidably through pins 13 journaled in the bifurcated lower ends of said arms. The rods 10 extend sufficiently forward of the pins 13 to carry compression springs 14 engaged between sleeves 15 and adjusting nuts 16, the latter engaging the threaded forward end portions of the rods 10, and each being acted upon by a lock-nut 17 to hold it in adjustment. The sleeves 15 abut against the pins 13 and have concaved end bearing faces conforming to said pins.

In the operation of the described invention, when pressure is applied forwardly to the pedal 8, a pulling force is transmitted through the rod 9 to rock the shaft 5. The springs 14 receive and transmit the actuating effort from said rock-shaft to the pull rods 10, from which said effort is transmitted to rock the arms 11 and thereby apply the brakes. The nuts 16 permit of ready adjustment of the springs 14 to regulate the tension therein so as to equalize the distribution of the braking pressure upon the two drive wheels of the vehicle, and the action of the springs will then be such as to absorb and cushion any sudden or abrupt application of pressure upon the brake pedal and to yieldably transmit such pressure in a manner to effect an even and gradual application of the braking force upon the wheels.

What I claim is:

1. In a vehicle brake mechanism, the combination with a control element, of a rock-arm actuable by said element, a pin journaled in the free end of said arm, a pull rod transmitting the controlling effort from said arm to a drive wheel, the forward end of said rod having fixed and movable abutments and being slidable in said pin, and a spring coiled upon said rod between said abutments yieldably transmitting the controlling effort to the rod from the arm.

2. In a vehicle brake mechanism, the combination with a control element, of a rock-shaft, means for transmitting the controlling effort to said shaft from said pedal, arms mounted upon said rock-shaft, pins journaled in said arms, pull rods passing slidably through said pins, springs transmitting the control effort from said arms to said rods, said springs being mounted forwardly of said pins, and adjusting nuts forming front abutments for said springs.

In testimony whereof I sign this specification.

WILLIAM J. McGOLDRICK.